United States Patent
Wang et al.

(10) Patent No.: US 11,586,513 B2
(45) Date of Patent: Feb. 21, 2023

(54) LIVE MIGRATING VIRTUAL MACHINES TO A TARGET HOST UPON FATAL MEMORY ERRORS

(71) Applicant: Google LLC, Mountain View, CA (US)

(72) Inventors: Jue Wang, Redmond, WA (US); Qiuyi Jia, Seattle, WA (US); Adam Ruprecht, Seattle, WA (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 16/950,181

(22) Filed: Nov. 17, 2020

(65) Prior Publication Data

US 2022/0156159 A1    May 19, 2022

(51) Int. Cl.
| | | |
|---|---|---|
| *G06F 11/00* | (2006.01) | |
| *G06F 11/14* | (2006.01) | |
| *G06F 9/455* | (2018.01) | |
| *G06F 11/10* | (2006.01) | |
| *G06F 11/30* | (2006.01) | |

(52) U.S. Cl.
CPC ...... *G06F 11/1484* (2013.01); *G06F 9/45558* (2013.01); *G06F 11/1068* (2013.01); *G06F 11/301* (2013.01); *G06F 11/3037* (2013.01)

(58) Field of Classification Search
CPC ............. G06F 11/1484; G06F 11/1068; G06F 11/301; G06F 11/3037; G06F 11/0712; G06F 11/1004; G06F 11/203; G06F 9/45558; G06F 2009/45583; G06F 2009/45591

See application file for complete search history.

(56) References Cited

U.S. PATENT DOCUMENTS

| | | |
|---|---|---|
| 11,113,094 B1 | 9/2021 | Koryakin et al. |
| 2009/0144579 A1 | 6/2009 | Swanson |
| 2010/0037097 A1 | 2/2010 | Kobayashi et al. |
| 2014/0089725 A1* | 3/2014 | Ackaret ............. G06F 11/1484 711/171 |
| 2015/0026807 A1 | 1/2015 | Lutas |
| 2019/0012110 A1 | 1/2019 | Okano et al. |
| 2019/0369903 A1* | 12/2019 | Tsirkin ............... G06F 12/1036 |

(Continued)

OTHER PUBLICATIONS

Ruprecht et al. VM Live Migration at Scale. Mar. 25, 2018. Virtual Execution Environments, ACM, 2 Penn Plaza, Suite 701, New York, NY, USA, pp. 45-56, DOI: 10.1145/3186411.3186415.

(Continued)

*Primary Examiner* — Joseph D Manoskey
(74) *Attorney, Agent, or Firm* — Lerner, David, Littenberg, Krumholz & Mentlik, LLP

(57) ABSTRACT

The disclosed technology provides techniques, systems, and apparatus for containing and recovering from uncorrectable memory errors in distributed computing environment through migration of virtual machines and associated memory to a target host machine. An aspect of the disclosed technology includes a hypervisor or virtual machine manager that receives signaling of an uncorrectable memory error detected by a host machine. The virtual machine manager then uses information received via the signaling to identify virtual memory addresses or memory pages associated with the corrupted memory element so as to allow for containment and recovery from the error, and for live migration of the virtual machine.

21 Claims, 9 Drawing Sheets

(56) References Cited

U.S. PATENT DOCUMENTS

2019/0391843 A1* 12/2019 Franciosi ............ G06F 12/1072
2021/0216394 A1*  7/2021 Gadi ................... G06F 11/0712
2021/0286686 A1*  9/2021 Prasad ................. G06F 11/301
2021/0294707 A1   9/2021 Evans et al.

OTHER PUBLICATIONS

International Search Report and Written Opinion for International Application No. PCT/US2021/059488 dated Mar. 11, 2022. 15 pages.
Kuhn. Method to handle memory errors during VM migration. Oct. 12, 2018. ip.com, West Henrieta, NY, US, 4 pages.
International Search Report and Written Opinion for International Application No. PCT/US2021/059517 dated Feb. 24, 2022. 17 pages.

* cited by examiner

200

400

LIVE MIGRATING VIRTUAL MACHINES TO A TARGET HOST UPON FATAL MEMORY ERRORS

BACKGROUND

Cloud computing has impacted the way in which enterprises manage computing needs. It provides reliability, flexibility, scalability, and redundancy in a cost-effective way. It enables an enterprise to manage its information technology needs without, for instance, traditional capital investment and maintenance considerations. As more and more computing shifts to cloud systems, these systems now store, process, and output data on a scale that years ago was likely unimaginable. An effect of this shift is that memory errors that occur in the cloud, if not contained and/or recovered from, can impact customer or user experience on a scale corresponding to an enterprise's footprint on the cloud. For instance, it is not untypical that detection of an uncorrectable memory error on a host leads to shutting down of the host resulting in abrupt termination of all hosted virtual machines (VMs). With memory sizes on the gigabyte or terabyte scale, that may impact thousands of VMs or applications that require lengthy time periods to reestablish.

When a physical memory experiences a memory fault, e.g., an "uncorrectable error," other yet undetected memory errors typically exist and that memory is likely "permanently" damaged. In such cases, migration of VMs while retaining their operational status can reduce downtime while containing the number and severity of memory error propagation.

BRIEF SUMMARY

Aspects of the disclosed technology may comprise methods or systems implemented in a cloud computing environment that allow for detection, containment (e.g., preventing corrupted data from propagating to a target host in a migration), and recovery from uncorrectable memory errors.

For instance, an aspect of the disclosed technology may comprise a method for uncorrectable memory error recovery in a cloud computing environment, comprising: receiving, at a virtual machine managing manager, signaling associated with an uncorrectable memory error detected by a source host machine; identifying one or more memory pages determined to be associated with the uncorrectable memory error as one or more respective poisoned memory pages; and sending unpoisoned memory pages associated with the source host machine to a target host machine, a given unpoisoned memory page being a memory page that is not identified as a poisoned memory page. The method may also comprise sending updated pages associated with modifications of unpoisoned memory pages made at the source to the target host machine.

Other aspects of the method may comprise pausing operation of one or more live virtual machines on the source host machine, the one or more live virtual machines associated with poisoned and unpoisoned memory pages. Further aspects may comprise resuming operation of the one or more live virtual machines on the target host machine. The method may further comprise reading information associated with the uncorrectable memory error from a bounce buffer. Further in accordance with the method, sending may comprise sending the updated pages while operations of one or more VMs at the source machine are paused. The method may also comprise performing checksums at the target host machine for only the unpoisoned memory pages or updating bitmaps for the unpoisoned memory pages and copying the updated bitmaps to generate the updated pages. In addition, sending may comprise sending the updated pages while operations of one or more VMs at the source host machine are paused. The method may also comprise transferring information associated with the poisoned pages to the target host. Transferring may comprise sending the poisoned memory pages before pausing operations of the virtual machines at the source host. Transferring may comprise sending the respective poisoned memory pages before pausing operations of one or more live virtual machines at the source host machine.

The method may also comprise excluding poisoned pages from a checksum calculation at the target. Further, the method may comprise migrating one or more live virtual machines on the source host machine to one or more virtual machines on the source machine based on the unpoisoned memory pages and the updated pages.

Another aspect of the disclosed technology may comprise a cloud computing system. The system may comprise a target host machine capable of supporting one or more virtual machines, a source host machine capable of supporting one or more virtual machines, and one or more processing devices coupled to a memory containing instructions. The instructions may cause the one or more processing devices to: receive signaling associated with an uncorrectable memory error detected by a source host machine; identify one or more memory pages determined to be associated with the uncorrectable memory error as one or more respective poisoned memory pages; send unpoisoned memory pages associated with the source host machine to a target host machine, a given unpoisoned memory page being a memory page that is not identified as a poisoned memory page; and send updated pages associated with modifications of unpoisoned memory pages made at the source to the target host machine.

The instructions may also cause the one or more processing devices to pause operation of one or more live virtual machines on the source host machine, the one or more virtual machines associated with poisoned and unpoisoned memory pages. The instructions may also cause the one or more processing devices to resume operation of the one or more live virtual machines on the target host machine. Further, the instructions may cause the one or more processing devices to read information associated with the uncorrectable memory error from a bounce buffer or to perform checksums at the target host for only the unpoisoned memory pages. The instructions may further cause the one or more processing devices to read information associated with the uncorrectable memory error from a bounce buffer. The instructions may also cause the one or more processing devices to update bitmaps for the unpoisoned memory pages and copy the updated bitmaps to generate the updated pages. Further still, the instructions may cause the one or more processing devices to send the updated pages while operations of one or more VMs at the source machine are paused.

In accordance with this aspect of the disclosed technology, the system may further comprise instructions that cause the one or more processing devices to transfer information associated with the poisoned pages to the target host. The instructions may also cause the one or more processing devices to send the poisoned memory pages before pausing operations of the virtual machines at the source host. The instructions may further cause the one or more processing devices to exclude poisoned pages from a checksum calculation at the target.

Additional aspects of the disclosed technology may comprise one or more non-transitory computer-readable media having stored thereon instructions that cause one or more processing devices to perform a process or method for uncorrectable memory error recovery in a cloud computing environment, comprising: receiving, at a virtual machine managing manager, signaling associated with an uncorrectable memory error detected by a source host machine; identifying one or more memory pages determined to be associated with the uncorrectable memory error as one or more respective poisoned memory pages; and sending unpoisoned memory pages associated with the source host machine to a target host machine, a given unpoisoned memory page being a memory page that is not identified as a poisoned memory page. The method or process may also comprise sending updated pages associated with modifications of unpoisoned memory pages made at the source to the target host. The instructions may comprise one or more other method or process steps of the disclosed technology.

DETAILED DESCRIPTION

Overview

Figure 1:
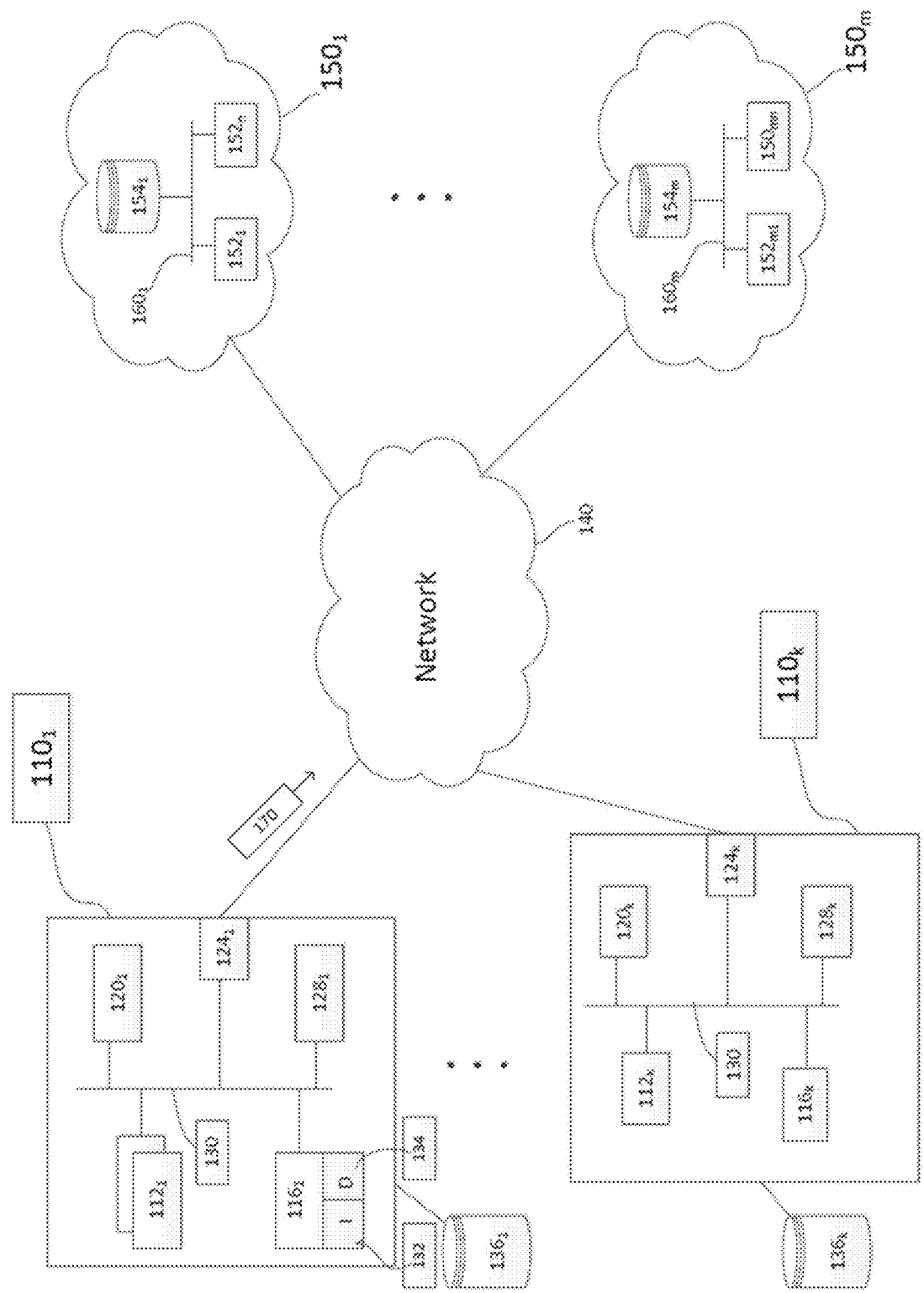
FIG. 1 illustratively depicts a block diagram of an example system or environment in accordance with aspects of the disclosed technology.

Memory errors are generally classified as correctable and uncorrectable. Correctable errors typically do not affect normal operation of a host machine, and thus a host computing system, in a cloud environment. Uncorrectable errors are typically fatal to the entire host computing system, causing, for example, the host machine to crash or shut down. In a cloud-based virtual machine environment, this implies that all virtual machines (VMs) supported by a host machine will crash or shutdown with the host, leaving no clue or little chance of recovery to the VMs/user(s). The impact of uncorrectable memory errors in a modern cloud computing system is typically significant, as these systems often times employ relatively large sized memories per host, e.g., a cloud computing engine may enable a single VM with as much as 12 terabytes of memory. These larger hosts typically experience a higher rate of uncorrectable memory errors than smaller hosts, e.g., more memory translates into more memory errors. Downtime due to memory errors is typically very costly.

The presence of uncorrectable errors can lead to additional complexity in managing the expected behavior of VMs as these uncorrectable errors are often symptomatic of additional damage of underlying physical memory, which may contain additional hidden or yet unknown errors. Further, correctable errors can become uncorrectable due to the presence of underlying hardware which will likely degrade over time. Unchecked, as the number of uncorrectable errors continue to increase, a critical crash of the physical host running one or more VMs and a corresponding crash of all the VMs on the host are likely. Thus, migrating a virtual machine which is running on corrupted hardware to a machine which is known to be "good" can mitigate the impact of detected uncorrectable errors and the downstream impact of such errors. However, additional factors must be taken into account during migration of a "live" machine, including that additional memory errors can also occur, which were unaccounted for during the start of the migration process.

Aspects of the disclosed technology comprise "live" migration of running VMs from one physical host to another physical host. In some examples, migration can occur in a series of steps, including migrating memory pages in a sequence of criticality. In some examples, the most relevant or critical portions of memory can be migrated. In some examples, emulation of memory errors can be performed to exclude certain memory sections or memory pages which are determined to be "poisoned." A poisoned memory page, for instance, may comprise a memory page with virtual memory location(s) that correspond(s) to a corrupted memory element on a host, e.g., a physical memory location with a flip bit or a corrupted memory component. Aspects of the disclosed technology allow for the preservation of certain types of memory errors (including the migration of those errors) to enable a consistent view to an end user after a live migration event. In addition, detection, identification, and processing of memory errors in the virtual environment, e.g., at the hypervisor abstraction level, may be used to improve live migration such as, for example, tracking and isolating poisoned pages so that they are not copied and transferred to a target host as part of the natural live migration process. Other aspects may include notifying the target host of poisoned pages or corrupted memory locations such that computations, e.g., checksum computations, at the target host do not include the poisoned pages or corrupted memory locations.

Aspects of the disclosed technology include the migration of one or more VMs. In some examples, the VMs can be migrated in an order which is based on the importance, current use, or number of critical errors associated with a particular virtual machine. In some examples, all VMs running on one particular host which contains one or more uncorrectable memory errors can be migrated to a healthy physical host upon detection of the one or more uncorrectable memory errors.

Aspects of the disclosed technology include an architecture which is abstracted and generic from specific underlying microarchitecture platforms, allowing for "universal" abstraction of virtual machines across multiple host platforms or architectures.

Aspects of the disclosed technology enable the containment of certain types of memory errors to preserve data integrity, stability, scalability, and robustness of virtual machine environments, by migration of VMs from one host to another host.

An aspect of the disclosed technology comprises a cloud computing infrastructure that allows a host and its associated VM(s) to stay up and/or recover from memory errors, including uncorrectable memory errors, as well as localize and contain the memory errors so that they do not impact other parts of the system such as guest VM(s) workloads.

For instance, the disclosed technology comprises configuring a host machine BIOS (including the associated memory elements) to enable error signaling recoverable at an operating system (OS), enhancing and enabling the OS's recovery path upon detection of memory errors on memory pages. An example of the disclosed technology comprises a central processing unit (CPU) capability that can signal an operating system (OS) with context information associated with memory errors (e.g., address, severity, whether signaled in isolation such that the error is recoverable, etc.). Such a mechanism may, for example, comprise Intel's x86 machine check architecture, in which the CPU reports hardware errors to the OS. A machine check exception (MCE) handler in the OS's kernel, such as provided via Linux for example, may then use an application programming interface (API) such as POSIX to signal a virtual machine manager as to the existence of the error, as well as provide context information about the error (e.g., location, error type, unrecoverable or not, status as to neighboring memory locations, etc.). The virtual machine manager may then take into the error information as part of initiation of a live migration process.

For instance, an aspect of the disclosed technology comprises a cloud computing system or architecture in which a mechanism is provided so that a virtual machine manager or hypervisor includes a capability to be alerted by a host machine of memory errors, particularly uncorrectable memory errors. The hypervisor, upon being alerted, processes the memory error information it receives from the host machine to determine VMs that may be accessing the corrupted memory element identifiable from the memory error information included in the alert. The hypervisor, upon identifying affected VMs, may initiate processes to failover VMs running on the affected host machine so that the host machine may ultimately be repaired.

As may be appreciated, a cloud computing system or architecture implemented in accordance with the foregoing mechanism can contain and allow for graceful recovery from uncorrectable memory errors. Specifically, by identifying the affecting memory, an hypervisor can limit or eliminate use (e.g., reads or accesses) of such memory prospectively. In addition, the hypervisor can limit the impact to only the affected VM. In addition, the hypervisor may initiate failover of the affected VM properly, and then manage moving unaffected VMs supported by the corrupted host to another host, to allow the corrupted host to be repaired. In this way, a customer's or user's exposure to the impact of uncorrectable memory errors may be limited to only affected VMs whose virtual memory is linked to the corrupted physical memory element or address, while unassociated VMs are kept unaware of the error and suffer no impact from it.

Example Systems

FIG. 1 is an example system 100 in accordance with aspects of the disclosure. System 100 includes one or more computing devices 110, which may comprise computing devices $110_1$ through $110_k$; a network 140; and one or more cloud computing systems 150, which may comprise cloud computing systems $150_1$ through $150_m$. Computing devices 110 may comprise computing devices located at customer locations that make use of cloud computing services such as Infrastructure as a Service (IaaS), Platform as a Service (PaaS), and/or Software as a Service (SaaS). For example, if a computing device 110 is located at a business enterprise, computing device 110 may use cloud systems 150 as a service that provides software applications (e.g., accounting, word processing, inventory tracking, etc. applications) to computing devices 110 used in operating enterprise systems.

As an alternative example, computing device 110 may lease infrastructure in the form of virtual machines on which software applications are run to support enterprise operations.

As shown in FIG. 1, each of computing devices 110 may include one or more processors 112, memory 116 storing data (D) and instructions (I), display 120, communication interface 124, and input system 128, which are shown as interconnected via network 130. Computing device 110 may also be coupled or connected to storage 136, which may comprise local or remote storage, e.g., on a Storage Area Network (SAN), that stores data accumulated as part of a customer's operation. Computing device 110 may comprise a standalone computer (e.g., desktop or laptop) or a server associated with a customer. A given customer may also implement as part of its business multiple computing devices as servers. If a standalone computer, network 130 may comprise data buses, etc., internal to a computer; if a server, network 130 may comprise one or more of a local area network, virtual private network, wide area network, or other types of networks described below in relation to network 140. Memory 116 stores information accessible by the one or more processors 112, including instructions 132 and data 134 that may be executed or otherwise used by the processor(s) 112. The memory 116 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods, and routines of the instructions are explained in more detail below.

The data 134 may be retrieved, stored, or modified by processor 112 in accordance with the instructions 132. As an example, data 134 associated with memory 116 may comprise data used in supporting services for one or more client devices, an application, etc. Such data may include data to support hosting web-based applications, file share services, communication services, gaming, sharing video or audio files, or any other network based services.

The one or more processors 112 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within a single block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing, and transmitting the data to and from other computing devices as part of customer's business operation.

Computing device 110 may also include a display 120 (e.g., a monitor having a screen, a touch-screen, a projector, a television, or other device that is operable to display information) that provides a user interface that allows for controlling the computing device 110 and accessing user space applications and/or data associated VMs supported in one more cloud systems 150, e.g., on a host in a cloud system 150. Such control may include for example using a computing device to cause data to be uploaded through input system 128 to cloud system 150 for processing, cause accumulation of data on storage 136, or more generally, manage different aspects of a customer's computing system. In some examples, computing device 110 may also access an API that allows it to specify workloads or jobs that run on VMs in the cloud as part of IaaS or SaaS. While input system 128 may be used to upload data, e.g., a USB port, computing device 110 may also include a mouse, keyboard, touch-screen, or microphone that can be used to receive commands and/or data.

The network 140 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device interfaces with network 140 through communication interface 124, which may include the hardware, drivers, and software necessary to support a given communications protocol.

Cloud computing systems 150 may comprise one or more data centers that may be linked via high speed communications or computing networks. A given data center within system 150 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

As shown in FIG. 1, computing system 150 may be illustrated as comprising host machines 152, storage 154, and infrastructure 160. Host machines 152, storage 154, and infrastructure 160 may comprise a data center within a cloud computing system 150. Infrastructure 160 may comprise one or more host machines, as well as switches, physical links (e.g., fiber), and other equipment used to interconnect host machines within a data center with storage 154. Storage 154 may comprise a disk or other storage device that is partitionable to provide physical or virtual storage to virtual machines running on processing devices within a data center. Storage 154 may be provided as a SAN within the datacenter hosting the virtual machines supported by storage 154 or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS, or SaaS to customers or users as a result of requests for services originating at, for example, computing devices 110.

Figure 2:
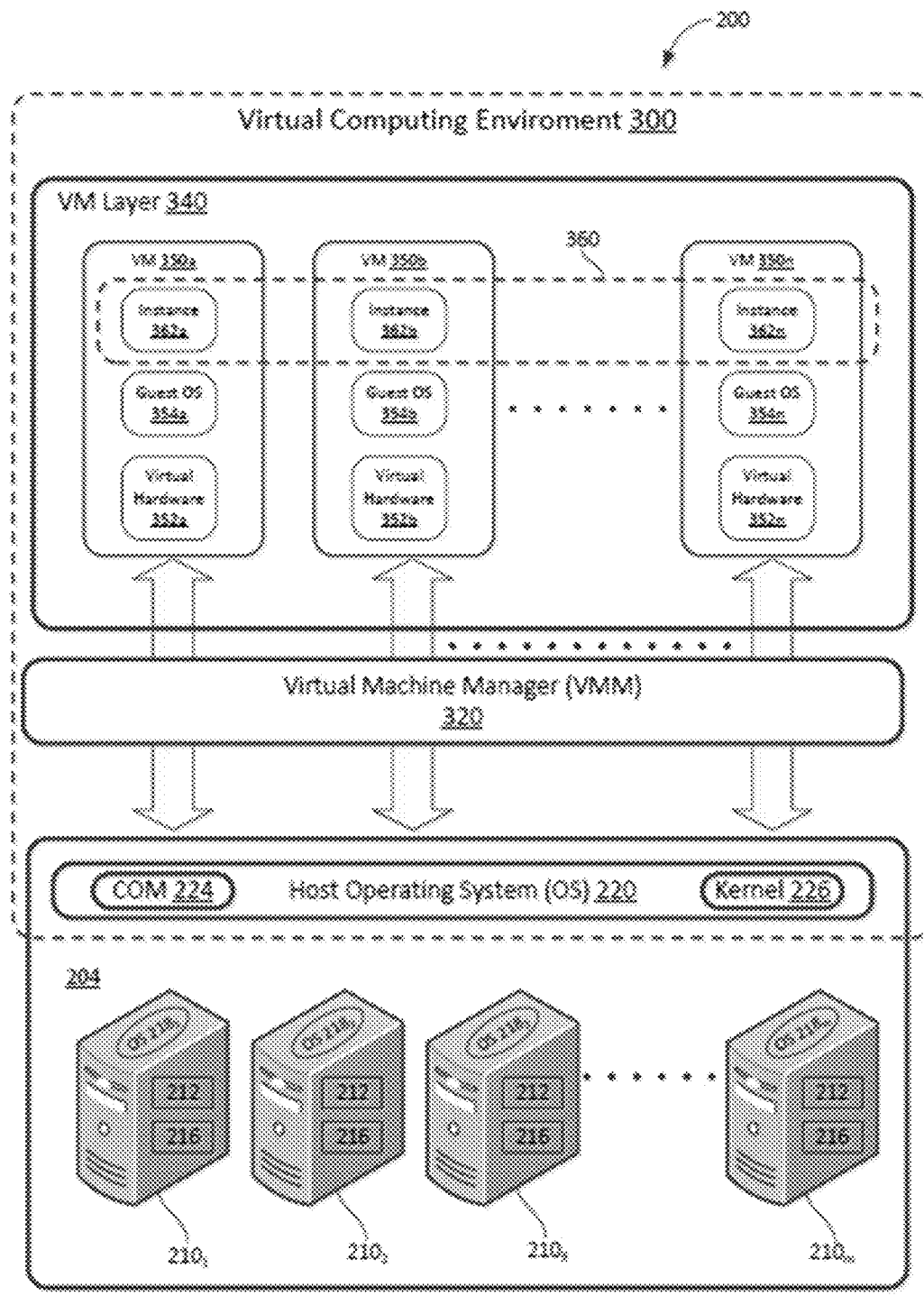
FIG. 2 illustratively depicts a block diagram of an example system or environment in accordance with aspects of the disclosed technology.

In the example shown in FIG. 2, a distributed system 200, such as that shown in relation to cloud systems 150 of FIG. 1, includes a collection 204 of host machines 210 (e.g., hardware resources 210) supporting or executing the virtual computing environment 300. The virtual computing environment 300 includes a virtual machine manager (VMM) 320 and a virtual machine (VM) layer 340 running one or more virtual machines (VMs) 350a-n configured to execute instances 362a, 362a-n of one or more software applications 360. Each host machine 210 may include one or more physical central processing units (pCPU) 212 ("data processing hardware 212") and associated memory hardware 216. While each hardware resource or host 210 is shown having a single physical processor 212, any hardware resource 210 may include multiple physical processors 212. Hosts 210 also include physical memory 216, which may be partitioned by host operating system (OS) 220 into virtual memory and assigned for use by VMs 350 in the VM layer 340, or even the VMM 320 or host OS 220. Physical memory 216 may comprise random access memory (RAM) and/or disk storage (including storage 154 accessible via infrastructure 160 as shown in FIG. 1).

Host operating system (OS) 220 may execute on a given one of the host machines 210 or may be configured to operate across a collection, including a plurality, of the host machines 210. For convenience, FIG. 2 shows the host OS 220 as operating across the collection of machines $210_1$ through $210_m$. Further, while the host OS 220 is illustrated as being part of the virtual computing environment 300, each host machine 210 is equipped with its own OS 218. However, from the perspective of a virtual environment, the OS on each machine appears as and is managed as a collective OS 220 to a VMM 320 and VM layer 340.

In some examples, the VMM 320 corresponds to a hypervisor 320 (e.g., a Compute Engine) that includes at least one of software, firmware, or hardware configured to create, instantiate/deploy, and execute the VMs 350. A computer, such as data processing hardware 212, associated with the VMM 320 that executes the one or more VMs 350 is typically referred to as a host machine 210 (as used above), while each VM 350 may be referred to as a guest machine. Here, the VMM 320 or hypervisor is configured to provide each VM 350 a corresponding guest operating system (OS) 354, e.g., 354a-n, having a virtual operating platform and manages execution of the corresponding guest OS 354 on the VM 350. As used herein, each VM 350 may be referred to as an "instance" or a "VM instance." In some examples, multiple instances of a variety of operating systems may share virtualized resources. For instance, a first VM 350 of the Linux® operating system, a second VM 350 of the Windows® operating system, and a third VM 350 of the OS X® operating system may all run on a single physical x86 machine.

The VM layer 340 includes one or more virtual machines 350. The distributed system 200 enables a user (through one or more computing devices 110) to launch VMs 350 on demand, i.e., by sending a command or request 170 (FIG. 1) to the distributed system 200 (comprising a cloud system 150) via the network 140. For instance, the command/request 170 may include an image or snapshot associated with the corresponding operating system 220 and the distributed system 200 may use the image or snapshot to create a root resource 210 for the corresponding VM 350. Here, the image or snapshot within the command/request 170 may include a boot loader, the corresponding operating system 220, and a root file system. In response to receiving the command/request 170, the distributed system 200 may instantiate the corresponding VM 350 and automatically start the VM 350 upon instantiation.

A VM 350 emulates a real computer system (e.g., host machine 210) and operates based on the computer architecture and functions of the real computer system or a hypothetical computer system, which may involve specialized hardware, software, or a combination thereof. In some examples, the distributed system 200 authorizes and authenticates the user device 110 before launching the one or more VMs 350. An instance 362 of a software application 360, or simply an instance, refers to a VM 350 hosted on (executing on) the data processing hardware 212 of the distributed system 200.

The host OS 220 virtualizes underlying host machine hardware and manages concurrent execution of one or more VM instances 350. For instance, host OS 220 may manage VM instances 350*a-n* and each VM instance 350 may include a simulated version of the underlying host machine hardware, or a different computer architecture. The simulated version of the hardware associated with each VM instance 350, 350*a-n* is referred to as virtual hardware 352, 352*a-n*. The virtual hardware 352 may include one or more virtual central processing units (vCPUs) ("virtual processor") emulating one or more physical processors 212 of a host machine 210. The virtual processor may be interchangeably referred to a "computing resource" associated with the VM instance 350. The computing resource may include a target computing resource level required for executing the corresponding individual service instance 362.

The virtual hardware 352 may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 362 of the software application 360. Here, the individual service instance 362 may be referred to as a guest instance that cannot determine if it is being executed by the virtual hardware 352 or the physical data processing hardware 212. A host machine's microprocessor(s) can include processor-level mechanisms to enable virtual hardware 352 to execute software instances 362 of applications 360 efficiently by allowing guest software instructions to be executed directly on the host machine's microprocessor without requiring code-rewriting, recompilation, or instruction emulation. The virtual memory may be interchangeably referred to as a "memory resource" associated with the VM instance 350. The memory resource may include a target memory resource level required for executing the corresponding individual service instance 362.

The virtual hardware 352 may further include at least one virtual storage device that provides run time capacity for the service on the physical memory hardware 324. The at least one virtual storage device may be referred to as a storage resource associated with the VM instance 350. The storage resource may include a target storage resource level required for executing the corresponding individual service instance 362. The guest software executing on each VM instance 350 may further assign network boundaries (e.g., allocate network addresses) through which respective guest software can communicate with other processes reachable through an internal network 160 (FIG. 1), the external network 140 (FIG. 1), or both. The network boundaries may be referred to as a network resource associated with the VM instance 350.

The guest OS 354 executing on each VM 350 includes software that controls the execution of the corresponding individual service instance 362, e.g., one or more of 362*a-n* of the application 360 by the VM instance 350. The guest OS 354, 354*a-n* executing on a VM instance 350, 350*a-n* can be the same or different as the other guest OS 354 executing on the other VM instances 350. In some implementations, a VM instance 350 does not require a guest OS 354 in order to execute the individual service instance 362. The host OS 220 may further include virtual memory reserved for a kernel 226 of the host OS 220. The kernel 226 may include kernel extensions and device drivers, and may perform certain privileged operations that are off limits to processes running in a user process space of the host OS 220. Examples of privileged operations include access to different address spaces, access to special functional processor units in the host machine 210 such as memory management units, and so on. A communication process 224 running on the host OS 220 may provide a portion of VM network communication functionality and may execute in the user process space or a kernel process space associated with the kernel 226.

In accordance with aspects of the disclosed technology, unrecoverable memory errors, for example bit flips, that occur on a host machine 210 that implements MCE may be managed at the hypervisor layer to mitigate and/or avoid affected guest VMs crashing and contain the impact of unrecoverable memory error to only affected guest VMs. For example, the BIOS associated with a given host machine 210 is configured so that MCEs generated by pCPU 212 on the host are sent to kernel 226. The MCE includes context information about the error including, for example, the physical memory address, the severity of the error, whether the error is an isolated error, a component within a pCPU where the error was signaled from, etc. Kernel 226 relays the error to the hypervisor 320. Hypervisor 320 then processes that information to identify the virtual memories associated with the error and identifies any affected memory pages, as well as associated VMs. As VMs typically do not share virtual memory, a given memory error may be isolated to a given VM. Therefore, there is little to no risk of propagating the error beyond the affected VM(s). Hypervisor 320 then isolates the corrupted memory page to avoid the guest OS from accessing it. Next, the hypervisor informs the affected guest OS of the error by emulating the error. Specifically, the hypervisor injects an interrupt, e.g., interrupt 80, to the guest OS, which informs the guest OS of the error. In this way, for example, only a VM affected by the error is notified of the error and only that VM or the application associated with that VM may be restarted.

In addition, having been notified of corrupted virtual memory addresses or a memory page containing same, the affected VM may avoid reading from or accessing those memory locations, which results in containment of the error. For example, each memory read or access of a corrupted memory element generates an MCE. An aspect of disclosed technology mitigates and/or avoids causing multiple reads or accessing of corrupted memory elements after it's detected at the host level and the VMM and/or guest OS are notified of the error.

In other examples, a user application may be running across multiple virtual machines, and a memory error associated with a single VM may impact multiple VMs (e.g., a machine learning training job). In such examples, the impact of the error may require that more than one VM be notified of the error. For instance, if the hypervisor had distributed a given job or jobs among more than one VM, the hypervisor may then broadcast the error to all affected VMs. In this instance, the user may decide that shutting down and restarting the affected application is the viable option. In contrast, where a single VM is involved keeping the VM alive by, for example, providing it with a new memory page, or restarting it may be a viable option.

Example Processes or Methods

Figure 3A:
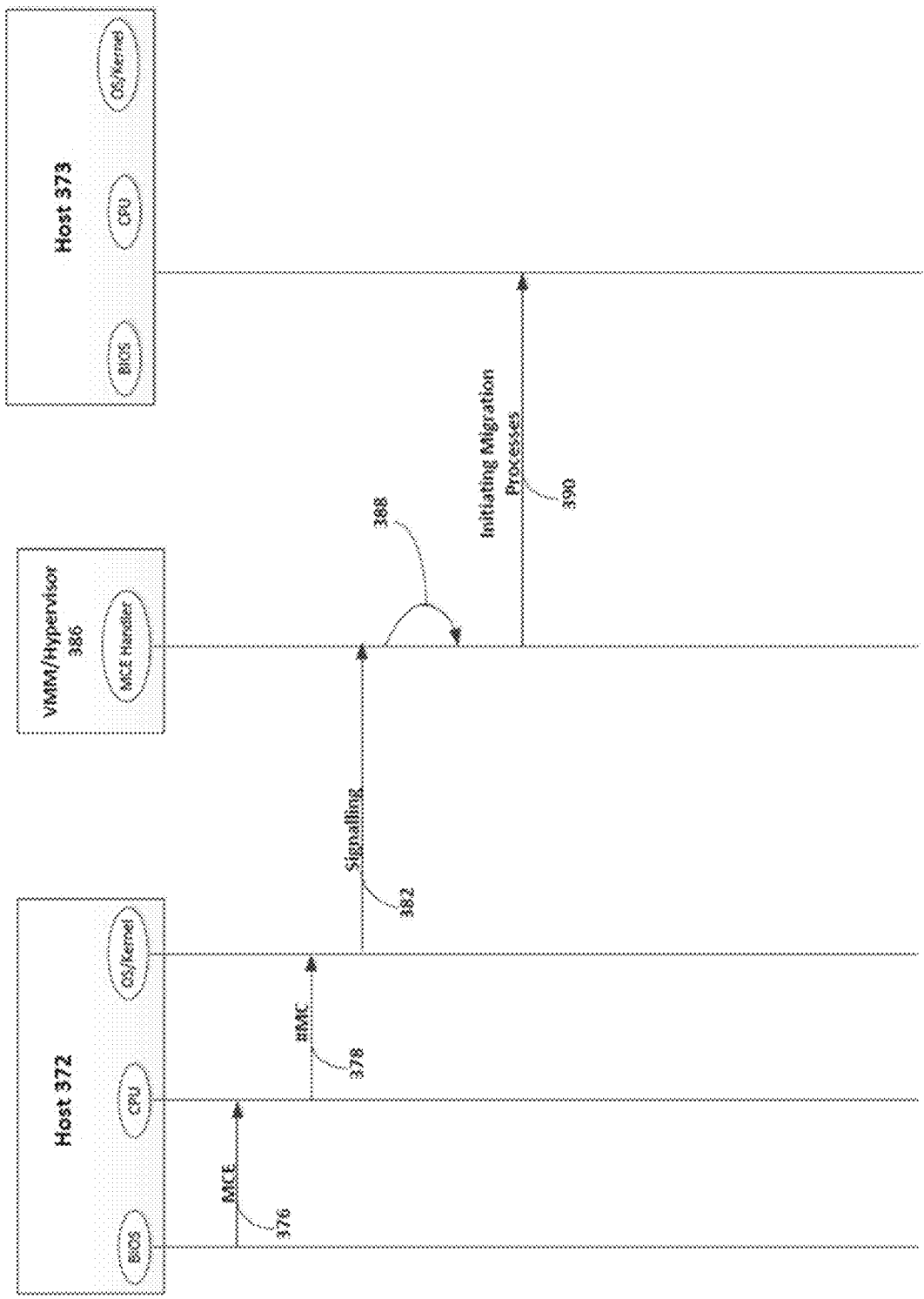
FIG. 3A illustratively depicts a flow or swim diagram of an example process or method in accordance with aspects of the disclosed technology.

An example of a processing flow or method 370 in accordance with aspects of the disclosed technology is shown in FIG. 3A. Host 372 includes a BIOS, CPU and a kernel (as part of its OS). The host is configured to detect uncorrectable memory errors and issue machine check exceptions (MCE) in response to such detection. In addition, a capability to classify detected uncorrectable memory errors is also provided. For example, the classification may include where the error is discovered, whether it is recoverable or not, and what type of recovery is allowed or necessary. For instance, some hardware architectures relay context information that signals software that recovery is not possible and therefore the kernel needs to enter panic mode. A typical example where that occurs is when execution context is corrupted (e.g., error occurs in the middle of a CPU executing certain instructions). When an uncorrectable memory error is detected in host 372, the BIOS sends an MCE to the CPU, line 376.

The CPU then relays the MCE information (depicted as #MC) to the kernel of host 372, line 378. #MC and MCE, or MCE information, may comprise the same context information or the same type of context information. A handler (e.g., MCE or #MC Handler) within the kernel receives the MCE information (#MC) as to the uncorrectable memory event, including context information, and signals (line 382) an MCE signal handler in hypervisor 386. Signaling may occur via a bus error signal (e.g., SIGBUS). Hypervisor 386 decodes the MCE information and maps it to the virtual memory space associated with the VMs supported by the affected host, line 388. In doing so, hypervisor 386 determines the virtual memory and memory page associated with the corrupted memory element. In addition, the hypervisor 386 emulates the MCE event, line 388. That is, the hypervisor 386 translates the context information associated with the physical memory error into context information associated with the virtual memory location. In addition, the hypervisor 386 may instantiate the processes necessary to have the VMs on the affected host 372, migrate to another host 373, line 390.

As indicated from the foregoing, aspects of the disclosed technology include having a MCE handler of a host kernel signal all the relevant MCE details to a virtual machine manager or hypervisor. With the hypervisor, a MCE SIG-BUS handler records memory error events in, for instance, a VmEvents table. The events table may include a field that records the following details: regular VM metadata (e.g., VM id, project id; MCE details: DIMM, rank, bank, MCA registers from all relevant banks). Optionally, neighbor information may also be recorded, e.g., which other VMs are on the host, on the same socket, etc. Neighbor information may be important in analyzing potential security attacks, such as for example a Row Hammer attack. In such an example, the disclosed technology may notify the guest user space of all the affected VMs and cause initiation of more graceful failover to another host.

At the host, memory error containment and memory error recovery is enabled in the BIOS, along with 110 stop and scream. Error signaling via a specific new MSI/NMI handler is added to the host kernel with the behavior of just panic to the host. The host kernel is configured to know which address space the MCE error belongs to and if the process is a VM.

Figure 3B:
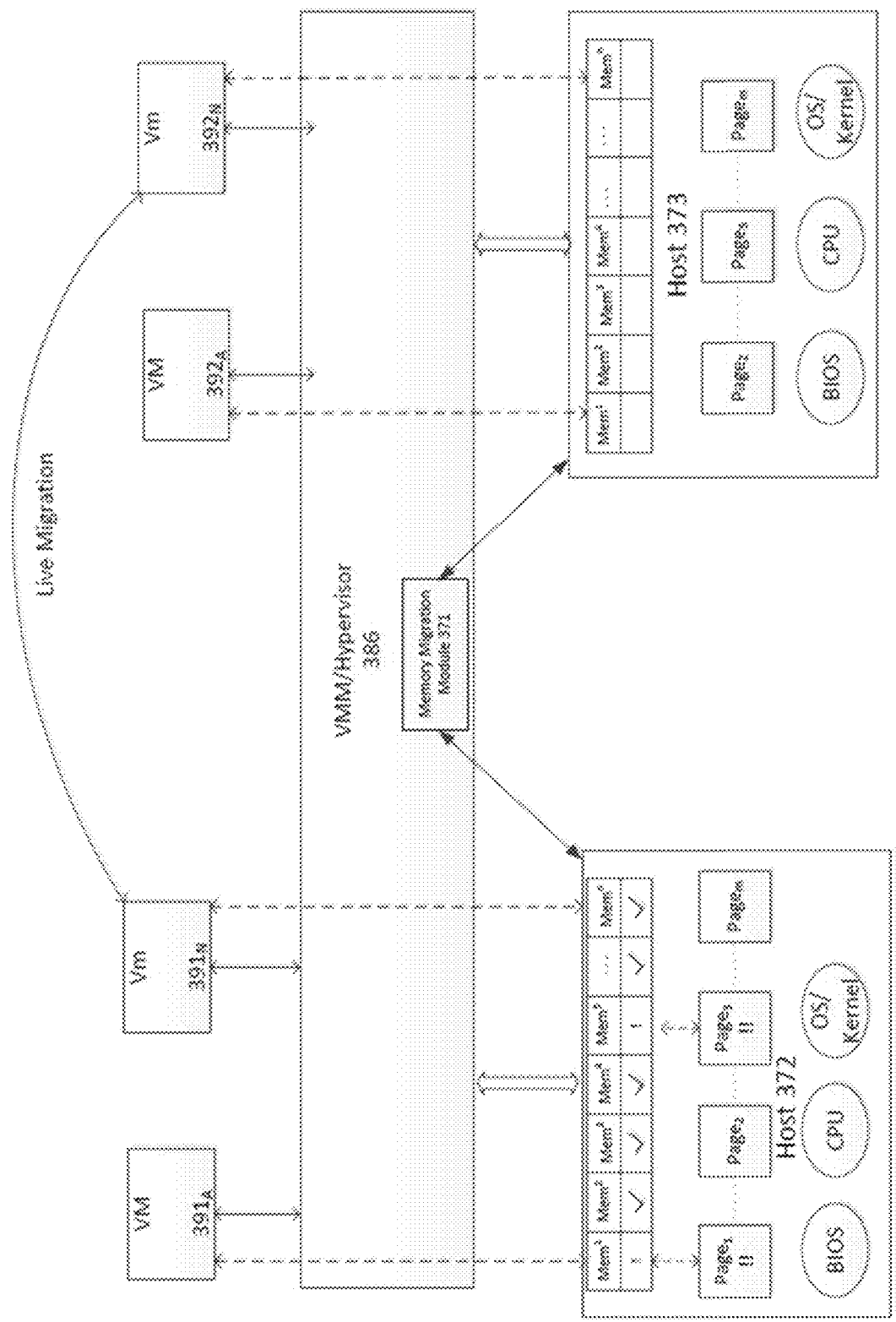
FIG. 3B illustratively depicts a flow or swim diagram of an example process or method in accordance with aspects of the disclosed technology.

FIG. 3B illustrates aspects of a method or an architecture in accordance with aspects of the disclosed technology. Host 372 and host 373 may contain various components, including a BIOS, CPU, and an OS/Kernel. In addition, host 372 and host 373 can contain volatile memory and non-volatile memory, which can be divided into a number of segments. Host 372 and host 373 can be similar to distributed system 200 or host machine 210, described above.

VMM/Hypervisor 386 can run on a host. As explained above, the VMM/Hypervisor 386 can control, orchestrate, or otherwise enable one or more VMs to be created and operate, such as VMs $391_A$ to $391_N$. Although only two VMs are illustrated for simplicity, it is to be understood that more than two VMs (e.g., 100s or even 1000s) can be instantiated or run on host 372. Each VM can correspond to a portion of the volatile or other memory on host 372. Hosts 372 and 373 need not reside in the same data center as part of a given cloud system (e.g., see systems 150 in FIG. 1). In some examples, migration may take place between hosts in different data centers in a cloud environment. In such a case, VMM/Hypervisor 386 may comprise distinct VMM/Hypervisor components at different physical locations or in different data centers. Moreover, in some examples, VMM/Hypervisor 386 may comprise distinct components in a given data center depending on how the underlying hosts are managed. Further, a VMM/Hypervisor may functionally distributed across multiple hosts or machines.

In some examples, as illustrated by the "!" in the memory, certain sections or portions of memory within host 372 can be known to contain unrecoverable errors. As explained with respect to FIG. 3B, these unrecoverable errors can affect the running of virtual machines and the guest applications or instances they support. As one example, VM $391_A$ can be running on a particular section of memory which contains an unrecoverable error related to a MCE. Other virtual machines may be using physical hardware, including volatile memory, which does not contain an error. The physical memory and other physical components used by a given VM are managed through the VMM/Hypervisor 386. For example, a given VM, even though it may use space on the physical memory of the host, is usually not aware of the actual physical memory address, etc., as the VMM typically maps that to virtual memory address in the VM environment.

The various memory sections may correspond to one or more memory pages, illustrated in FIG. 3B as part of host 372. In some examples, the one or more memory pages can be memory dumps of one or more sections of the volatile memory of host 372. Memory pages can be stored in any appropriate memory, such as low-level cache memory, non-volatile memory, or volatile memory. Certain memory pages corresponding to those with unrecoverable errors, such as MCEs, can be marked. In some examples, the pages can be marked or contain information identifying the page as being "poisoned" or containing poisoned memory. In some examples the memory pages can only contain "guest memory" or memory corresponding to a particular VM instance, such as instance 362a referenced in FIG. 2.

Host 373 can be similar to host 372, hypervisor 386 can control, orchestrate, or otherwise enable the operation of one or more VMs, such as VMs $392_A$ to $392_N$ specifically on host 373. In some examples, the number of VMs on host 373 can be the same as the number of VMs on host 372.

Memory migration module 371 can contain remote procedure calls, APIs, networking functionality, and other "low-level" memory operations, such as those occurring below or at the OS level, to enable transfer or migration of virtual machines from one host to another host. Memory migration module 371 can be distributed across one or more physical machines, such as host 372 and host 373. Memory migration module 371 can also run on a network connecting or otherwise allowing data to be transferred between host 372 and host 373, or other hosts.

Memory migration module 371 can also be able to generate checksums, read from bounce buffers, and be aware of MCE errors both in memory and in memory pages. Memory migration module 371 may use RPCs, software, or other APIs tailored to carry out the live migration functional aspects of the disclosed technology. Memory migration module 371 may comprise one or more modules that carry out the functions of the migration process (as discussed herein) and that may be implemented as a set of instructions running on one or more processing devices.

In some examples, memory migration module 371 can be "universal" and contain modules to abstract and be compatible across different types of hardware and physical hosts, such as those containing different models of processors, and to understand specific memory or other error codes generated by a particular physical machine.

Figure 4:
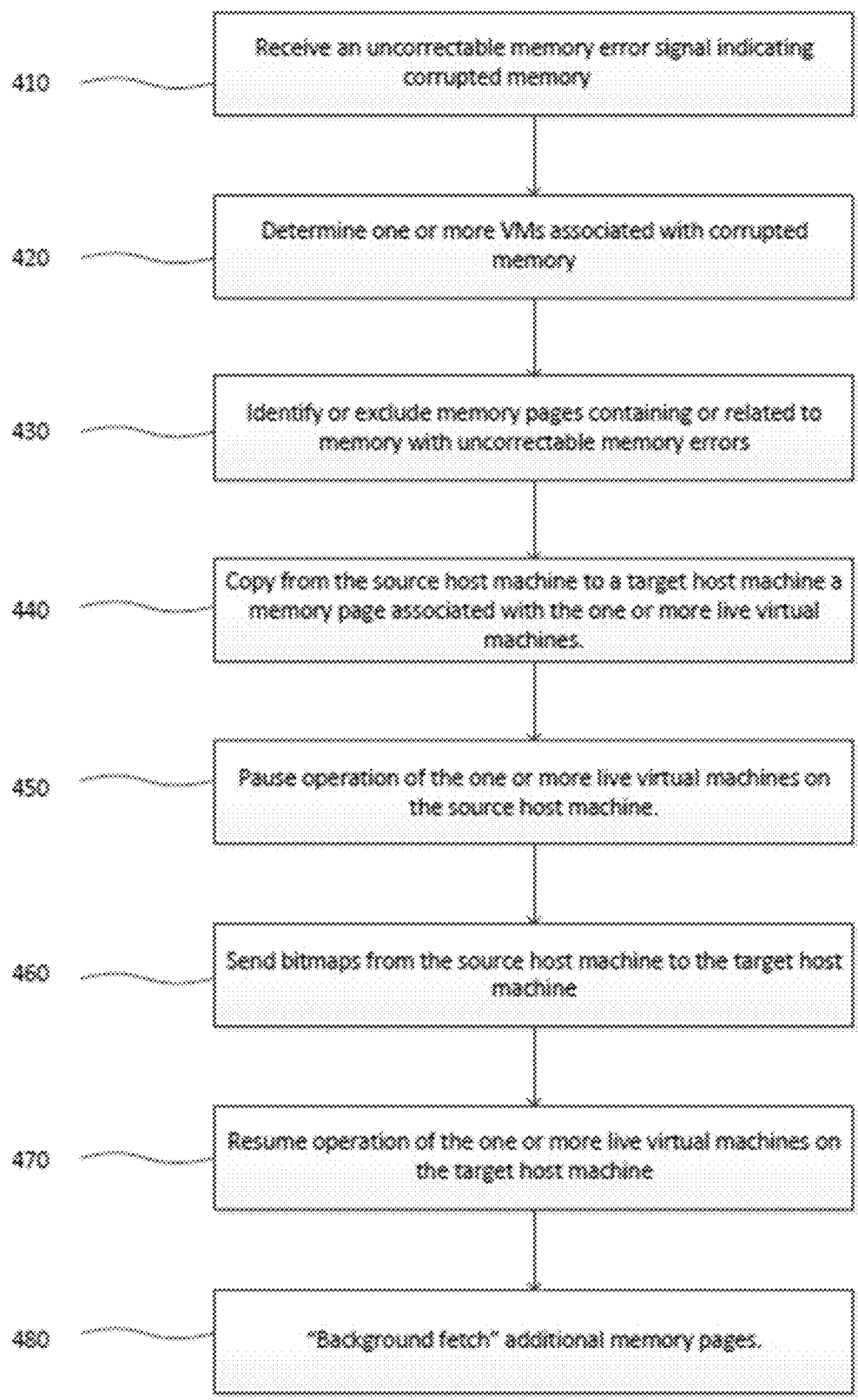
FIG. 4 depicts a flow diagram of an example process or method in accordance with aspects of the disclosed technology.

FIG. 4 illustrates a method or process 400 in accordance with aspects of the disclosed technology.

Method 400 can include detecting and forwarding MCE relating to uncorrectable memory errors to a virtual machine manager or hypervisor. The MCE information is decoded and mapped by the virtual machine manager or hypervisor to affected memory pages, and thus to the affected VM. The virtual machine manager or hypervisor can then begin a process of migrating the VM to another device. Further details regarding these operations have been described herein.

As shown at block 410, a virtual machine managing manager can receive a signal, the signal signaling an uncorrectable memory error detected by a source host machine.

At block 420, the virtual machine managing manager can determine one or more live virtual machines associated with a corrupted memory element based on the received signaling.

At block 430, the virtual machine managing manager or memory migration module can exclude copying memory pages containing uncorrectable memory errors.

At block 440, a virtual machine managing manager, or memory migration module, can copy from the source host machine to a target host machine, at least one memory page associated with the one or more live virtual machines.

At block 450, the virtual machine managing manager or memory migration module can pause operation of the one or more live virtual machines on the source host machine.

At block 460, the virtual machine managing manager or memory migration module can send bitmaps from the source host machine to the target host machine. Block 460 can occur while the one or more live virtual machines are paused.

At block 470, the virtual machine managing manager or memory migration module can resume operation of the one or more live virtual machines on the target host machine.

At block 480, the virtual machine managing manager or memory migration module can "background fetch" additional memory pages.

FIGS. 5A-5D illustrate aspects of live memory migration from a "source VM" to a "target VM." As illustrated with respect to FIGS. 5A-5D, aspects of the migration can be described with respect to time, such as for example, as "pre-copy" and "post-copy." In addition, the operational state of both the source VM and the target VM can be described during a live memory migration. In some examples, and as used in FIGS. 5A-5D, the "arrow of time" moves sequentially to the future from left to right, indicating an example in which blocks of actions can be performed. However, a person of skill in the art will recognize that the order of processes can be exchanged or reversed, and that certain processes can be duplicated.

As used in FIGS. 5A-5D, a "source VM" can be a virtual machine from which data or information is migrated and a "target VM" can be a virtual machine to which data or information is migrated. In some examples, a "source VM" can be associated with or operate on a particular physical machine, such as host machine 210. In some examples, method 500 can begin upon a particular error, such as an MCE described above occuring on the physical machine associated with the source VM. A "source" can refer to either a source VM or host machine corresponding to the source VM and a "target" can refer to either a target VM or a target machine corresponding to the target VM.

A person of skill in the art will recognize that the specific implementations of methods described with respect to FIGS. 5A-5D can vary, and involve one or more software modules, APIs, RPCs, and use one or more types of data structures, logs, binary structures, and hardware to carry out the methods.

Figure 5A:
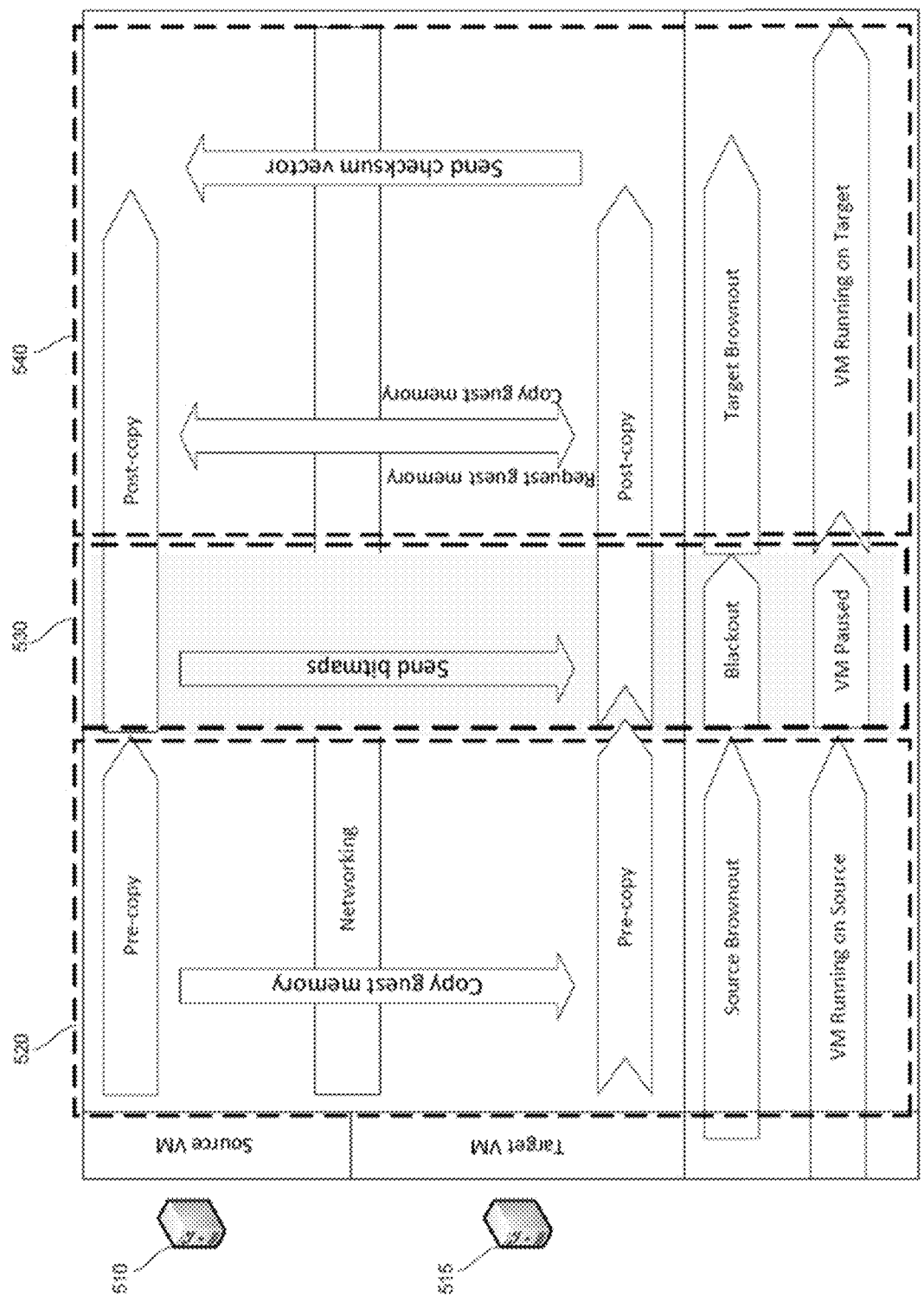
FIGS. 5A to 5D illustrate aspects of an example process or method, and sub-processes or sub-methods, in accordance with aspects of the disclosed technology.

FIG. 5A illustrates an example method 500. Illustrated in FIG. 5A are source VM 510 and target VM 515. As a summary, method 500 can consist of operations which can be conceptualized within a "pre-copy" stage and a "post-copy" stage. Method 500 can consist of any combination of the processes described with respect to FIGS. 5B-5D, including method 520, method 530, and method 540.

During the pre-copy stage, "guest memory" can be copied from source VM 510 to target VM 515. Guest memory can include memory which is created within a guest user space, or a guest user application. In some examples, guest memory can also refer to the underlying physical memory which corresponds with the particular virtual memory belonging to a particular guest user space or virtual machine instance. During the pre-copy stage, the source VM 510 runs on an associated source physical machine. At this stage, one or more processors copy guest memory to the target. For example, memory content is copied to a network buffer and sent over a network (e.g., network 160 of FIG. 1) via RPC protocols to the target VM 515, where there are corresponding RPC receiver threads on the target VM to receive and store the received guest memory into corresponding guest physical addresses.

As shown in FIG. 5A, during pre-copy and post-copy, the source or target may enter a brownout period where the VM is not paused though migration is occurring. During this phase, guest execution may be slowed down by, for example, dirty tracking or post-copy network page-ins.

Figure 5B:
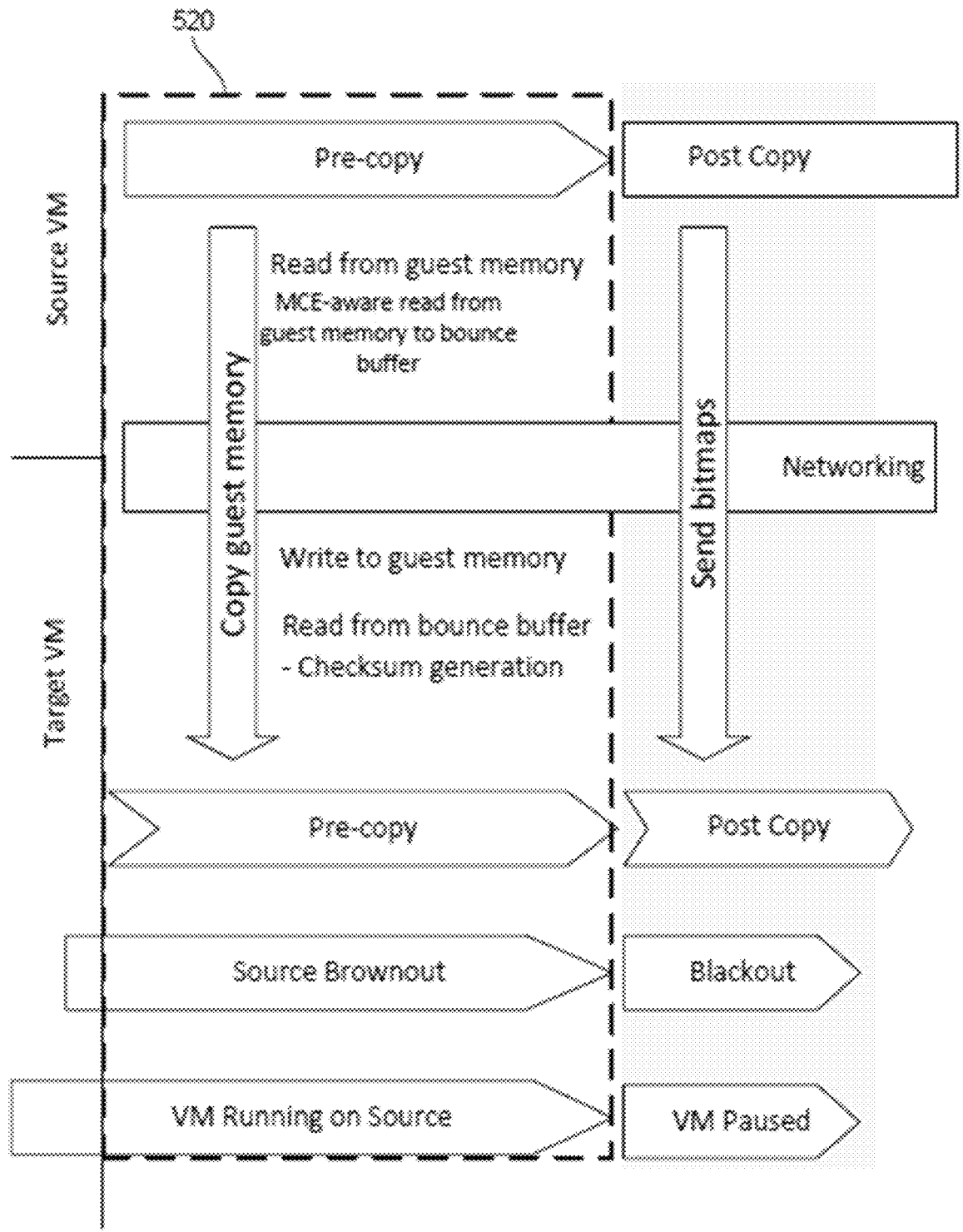

FIG. 5B illustrates aspects of method 500 or method 520 as they relate to a "pre-copy" stage. One or more memory migration modules, which can be groups of instructions to read, write, and track memory and memory pages can be used. Method 520 can be performed while a source virtual machine is "live" or active, allowing for a user to continue to use the virtual machine while method 520 is being performed.

As illustrated in FIG. 5B, during the process of migration from the source to the target, certain pages of memory can be modified due to user processes or other processing which occurs on the source VM. These differences can be tracked. Pages of memory which have been modified during the time in which guest memory is being transferred can be referred to as "dirty pages." In some examples, only a subset of certain pages can be transferred during the pre-copy stage. In some instances, a poisoned page may comprise a subset of dirty pages but such dirty pages will be skipped or not processed as part of regular dirty page processing on the migration target.

Guest memory can be read on source VM 510 and be written to guest memory of target VM 515. In some examples, the read and write processes can be performed through the use of one or more remote procedure calls or RPCs. In some examples, the remote procedure calls can use pointers to particular memory content to identify one or more portions of physical or virtual memory to be copied from source VM 510 to target VM 515.

In some examples, bounce buffers can be used as part of the transfer. A bounce buffer is a type of memory which resides in memory which is "low" enough architecturally for a processor to copy from and write data to. Pages can be allocated in a bounce buffer to organize memory. A memory migration module can repeatedly go through multiple passes of memory and through dirty pages as part of incrementally updating a "dirty bitmap" and copying dirty pages.

In some examples, "poisoned pages," or pages which contain unrecoverable errors, can also be tracked and identified. In some examples, pages which are "poisoned" can selectively be excluded from the memory migration process and from dirty pages. In some examples, upon the discovery of a MCE, a memory page associated with that MCE can be marked as poisoned. Memory migration modules can inform a memory bus of particular pages as being "poisoned" and cause a memory bus to avoid copying that memory from a source to a target.

Method 520 can also include the generation of checksums. Checksums can be generated following the write of guest memory from the source to the target. Checksums can be generated on both a source memory page and a related target memory page to ensure that the transfer of that memory page occurred without error. In some examples, checksums generation or checksum checking can be skipped for poisoned pages.

Method 520 can contain the following or similar processes described as pseudocode:

```
procedure MIGRATEMEMORY
    EnableMemoryDirtyTracking( )
    while not IsBlackout( ) do
        dirty pages ← ReadMemoryDirtyLogAndExcludePoisonedMemory( )
        for each page in dirty pages do
            data ← RetrieveGuestMemory(page)
            if data is not poisoned then
                SendUpdate(page, data)
    RetrieveGuestMemory(page):
        d ← MCEAwareReadFromGuest(page)
        return d
```

Described alternatively, method 520 can enable tracking of dirty memory pages, and while a "blackout" process is not implemented, ready dirty memory page logs, and for each dirty memory page log, send updates related to changes in that dirty memory page log from the source to the target, such as through a bitmap. Additionally, checksums and tracking of changes can be performed by a memory migration module as part of method 520.

Figure 5C:
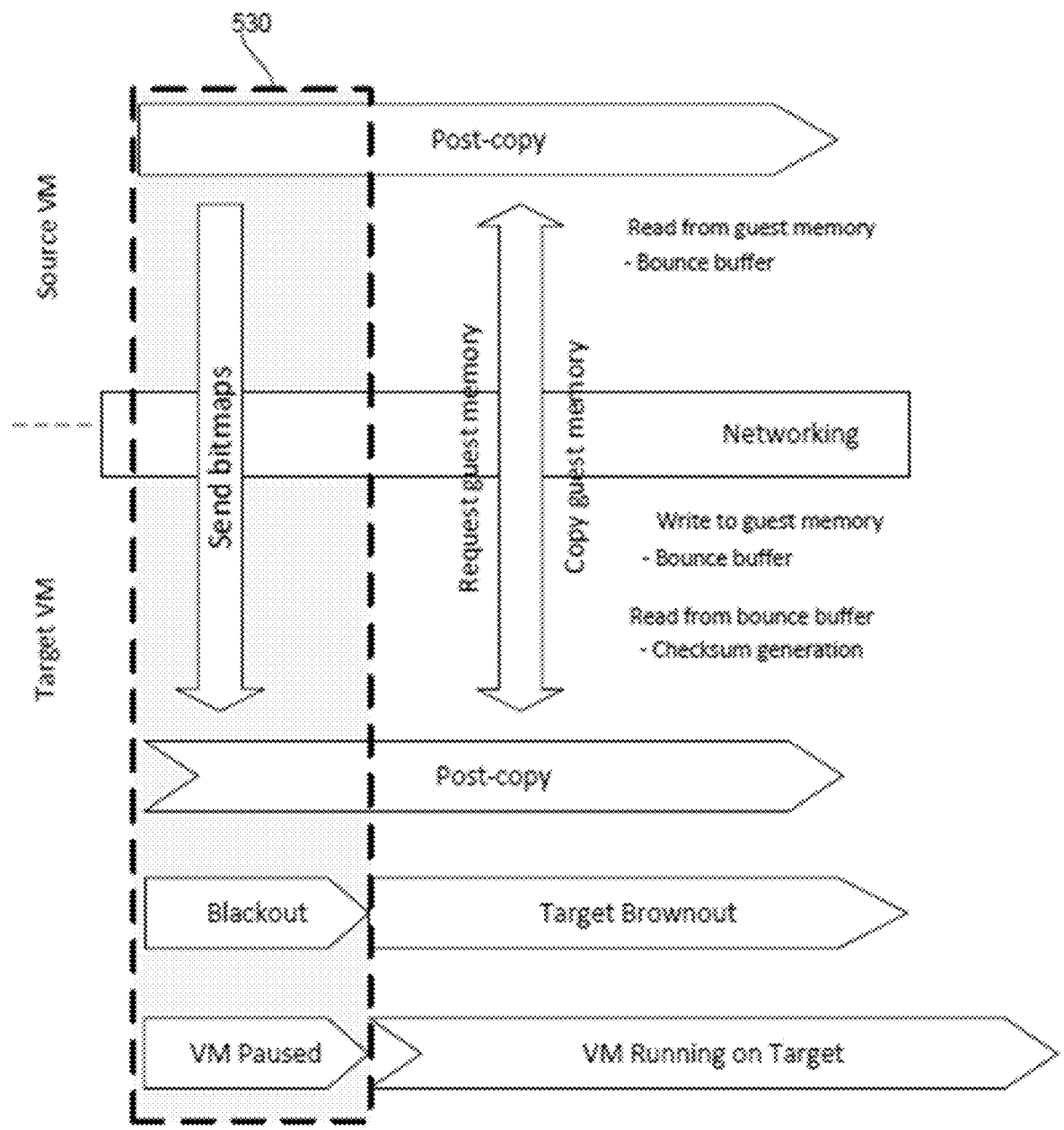

FIG. 5C illustrates aspects of method 500 or method 530 during a blackout period. During the blackout period, the source is "paused" and a user will not be able to operate or use the source VM. Poisoned pages can also be tracked and subtracted during method 530.

Method 530 can begin at the start of the blackout period or when the source VM is paused. A memory migration module can perform a pass through the memory of the source VM to identify the latest memory or the "last memory" prior to the blackout, and send a dirty bitmap to the target.

During method 530, information related to poisoned pages, or poisoned pages themselves, can be copied. As poisoned pages are expected to be rare, in some examples, a different structure than a "bitmap" can be used to transfer the poisoned pages or information related to the poisoned pages to limit memory overhead. In some examples, poisoned pages can be sent only once at the start of the blackout period as changes to the poisoned pages are expected to be minimal and poisoned pages themselves are expected to be rare.

Method 530 can contain the following or similar processes described as pseudocode:

```
OnBlackout( ):
    PauseGuest( )
    poisoned pages ← ReadMemoryPoisonedLog( )
    dirty pages ← Read Memory DirtyLog( )
    StartPostCopyOnTarget(dirty pages - poisoned pages)
```

Stated alternatively, in method 530, one or more memory logs can be read, and from reading the memory logs, only dirty pages excluding poisoned pages can be copied.

Figure 5D:
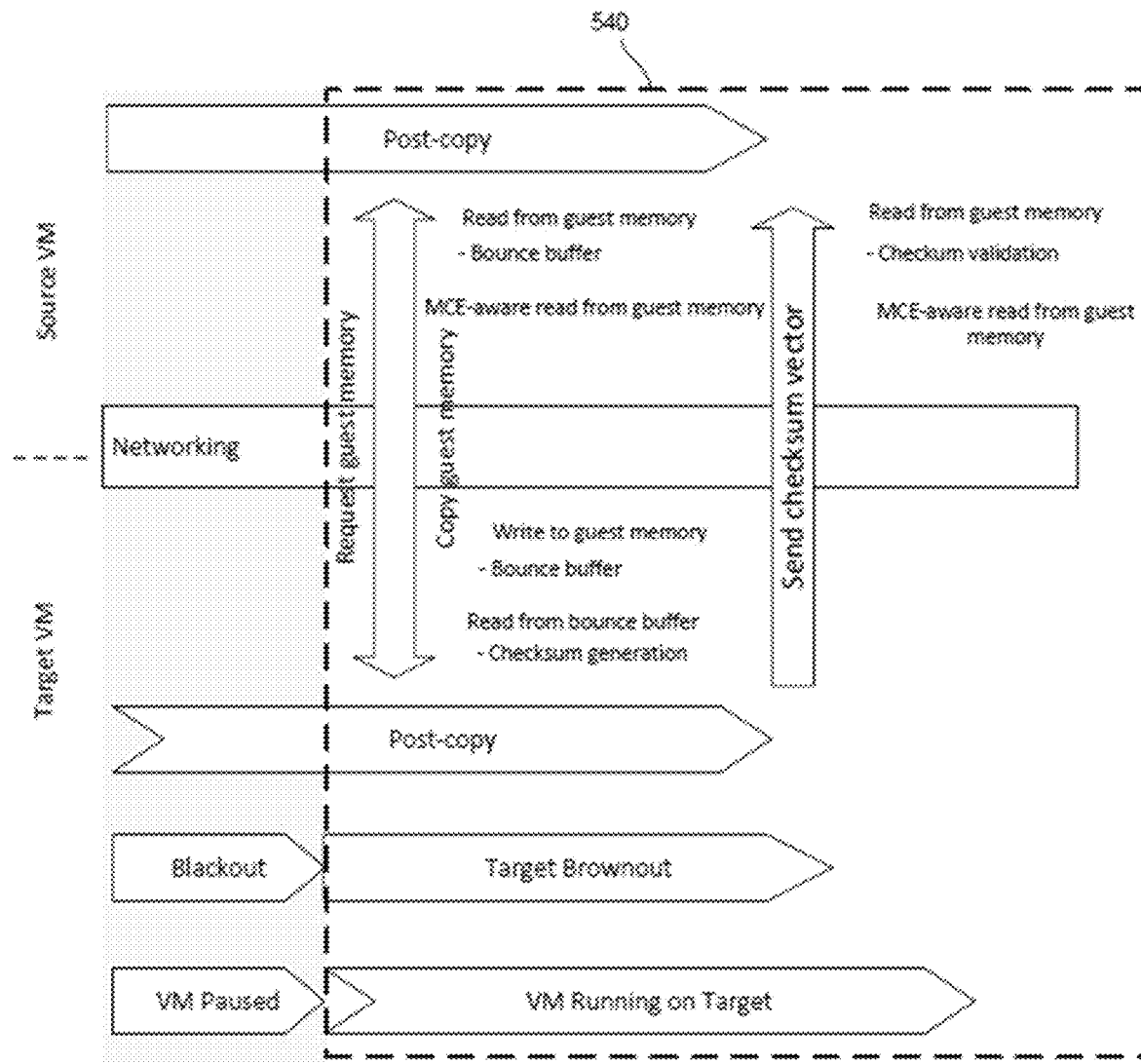

FIG. 5D illustrates aspects of method 500 or method 540, which can relate to a "post-copy" stage. At this stage, certain information has been transferred from the source to the target. At this stage, the virtual machine which was running on the source can now be run on the target. At this stage, the virtual machine running on the target may differ from the virtual machine running on the source, in that dirty memory pages and poisoned memory pages have not been transferred.

During post-copy or as part of method 540, "demand paging" can be initialized with a final dirty bitmap. A control for "demand paging" can initialize a Background Fetcher module with the same dirty bitmap. As explained above, this bitmap may already be aware of or contain the list of poisoned pages subtracted.

During post-copy or as part of method 540, background fetching of memory pages which have not yet been fetched or migrated from the source can be accessed by the background fetcher module or the memory migration module.

In some examples, on the target, upon the requirement of a particular memory page which has not yet been transferred from the target to the source, remote memory access (RMA) or other remote procedure calls can be used for the target to access memory pages not yet migrated to the target.

Upon receiving a memory page at the target, a checksum can be generated for the obtained memory content when no MCE error occurs or is associated with that particular memory page. This checksum can be used to verify that the memory migration process occurred correctly.

Method 540 can contain the following or similar processes which can be described as pseudocode:

```
On TargetStartPostCopy (dirty pages):
    ResumeGuest( )
    for each page in dirty pages do
        data ← RetrieveSourceGuestMemory(page)
        WriteToGuest(page, data)
On TargetGuestPageFault(page):
    data ← RetrieveSourceGuestMemory(page)
    WriteToGuest(page, data)
RetrieveSourceGuestMemory(page):
    d ← MCEAwareReadFromSourceGuest(page)
    return d
OnMigrationComplete( ):
    for each page in checksums do
        d ← ReadFromGuest(page)
        if d not poisoned:
            Assert(checksums[page] = Checksum(d))
```

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for uncorrectable memory error recovery in a cloud computing environment, comprising:
receiving, at a virtual machine managing manager, signaling associated with an uncorrectable memory error detected by a source host machine;
identifying one or more memory pages determined to be associated with the uncorrectable memory error as one or more respective poisoned memory pages;
sending unpoisoned memory pages associated with the source host machine to a target host machine while excluding the poisoned memory pages from the sending, a given unpoisoned memory page being a memory page that is not identified as a poisoned memory page; and
sending updated pages associated with modifications of unpoisoned memory pages made at the source to the target host machine.

2. The method of claim 1, comprising pausing operation of one or more live virtual machines on the source host machine, the one or more live virtual machines associated with poisoned and unpoisoned memory pages.

3. The method of claim 2, comprising resuming operation of the one or more live virtual machines on the target host machine.

4. The method of claim 1, comprising reading information associated with the uncorrectable memory error from a bounce buffer.

5. The method of claim 1, comprising performing checksums at the target host machine for only the unpoisoned memory pages.

6. The method of claim 1, comprising updating bitmaps for the unpoisoned memory pages and copying the updated bitmaps to generate the updated pages.

7. The method of claim 6, wherein sending comprises sending the updated pages while operations of one or more VMs at the source host machine are paused.

8. The method of claim 1, comprising transferring information associated with the respective poisoned memory pages to the target host machine.

9. The method of claim 8, wherein transferring comprises sending the respective poisoned memory pages before pausing operations of one or more live virtual machines at the source host machine.

10. The method of claim 1, comprising excluding poisoned pages from a checksum calculation at the target host machine.

11. The method of claim 1, comprising migrating one or more live virtual machines on the source host machine to one or more virtual machines on the target host machine based on the unpoisoned memory pages and the updated pages.

12. A cloud computing system, comprising:
a target host machine capable of supporting one or more virtual machines;
a source host machine capable of supporting one or more virtual machines; and
one or more processing devices coupled to a memory containing instructions, the instructions causing the one or more processing devices to:
receive signaling associated with an uncorrectable memory error detected by a source host machine;
identify one or more memory pages determined to be associated with the uncorrectable memory error as one or more respective poisoned memory pages;
send unpoisoned memory pages associated with the source host machine to the target host machine while excluding the poisoned memory pages from being sent, a given unpoisoned memory page being a memory page that is not identified as a poisoned memory page; and
send updated pages associated with modifications of unpoisoned memory pages made at the source to the target host machine.

13. The cloud computing system of claim 12, the instructions causing the one or more processing devices to pause operation of one or more live virtual machines on the source host machine, the one or more live virtual machines associated with poisoned and unpoisoned memory pages.

14. The cloud computing system of claim 13, the instructions causing the one or more processing devices to resume operations associated with the one or more live virtual machines on the target host machine.

15. The cloud computing system of claim 12, the instructions causing the one or more processing devices to read information associated with the uncorrectable memory error from a bounce buffer.

16. The cloud computing system of claim 12, the instructions causing the one or more processing devices to perform checksums at the target host machine for only the unpoisoned memory pages.

17. The cloud computing system of claim 12, the instructions further causing the one or more processing devices to update bitmaps for the unpoisoned memory pages and copying the updated bitmaps to generate the updated pages.

18. The cloud computing system of claim 12, the instructions further causing the one or more processing devices to send the updated pages while operations of one or more VMs at the source host machine are paused.

19. The cloud computing system of claim 12, the instructions further causing the one or more processing devices to transfer information associated with the poisoned pages to the target host.

20. The cloud computing system of claim 12, the instructions further causing the one or more processing devices to send the poisoned memory pages before pausing operations of the virtual machines at the source host.

21. The cloud computing system of claim 12, the instructions further causing the one or more processing devices to exclude poisoned pages from a checksum calculation at the target.

* * * * *